B. D. STEVENS.
Door-Plate.
No. 160,482.    Patented March 2, 1875.
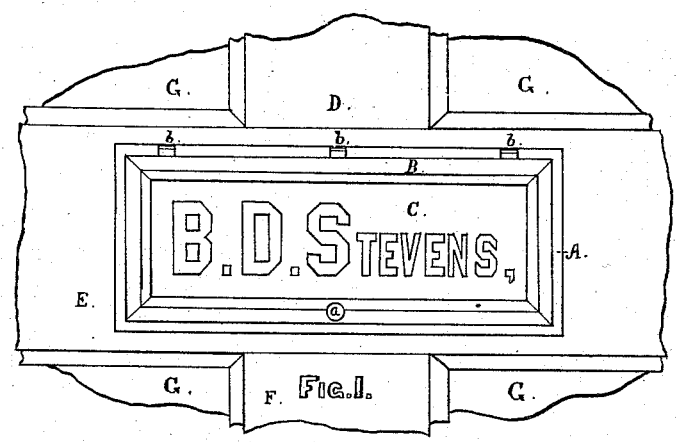
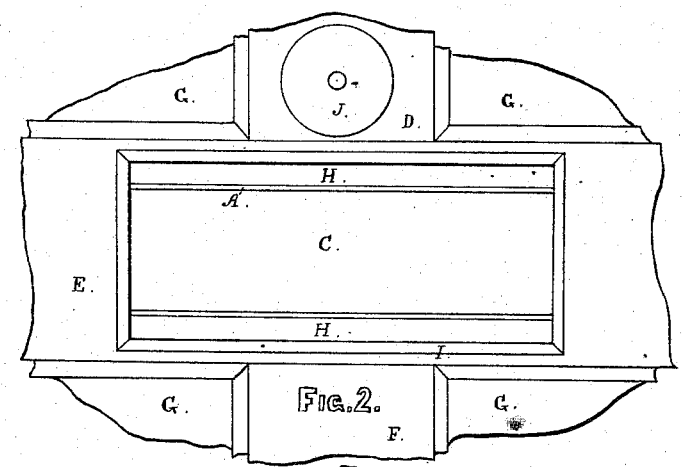
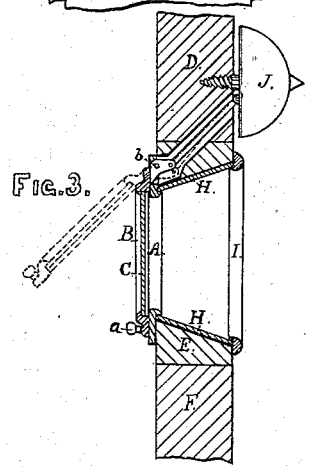
WITNESSES:
Chas. D. Moore
Joseph E. Russell
INVENTOR:
Benj. D. Stevens

UNITED STATES PATENT OFFICE.

BENJAMIN D. STEVENS, OF LAWRENCE, ASSIGNOR, BY MESNE ASSIGNMENTS, OF ONE-HALF HIS RIGHT TO ANTHONY STEVENS, OF BOSTON, MASS.

IMPROVEMENT IN DOOR-PLATES.

Specification forming part of Letters Patent No. 160,482, dated March 2, 1875; application filed August 12, 1874.

*To all whom it may concern:*

Be it known that I, BENJ. D. STEVENS, of Lawrence, in the county of Essex and Commonwealth of Massachusetts, have invented a Transparent Door-Plate, of which the following is a specification:

The object of my invention is to furnish a transparent door-plate which shall be lighted from the hall or room into which the door opens, and so designed and constructed that the plate on which the name is placed can be removed and a new one substituted in its place. Thus, the place cut for the light to pass will be permanently closed, as a change of residents does not change the plate-frame; or, when the tenement is closed, the name-plate is removed, thus leaving a plain ground-glass plate. There are on the inner side of the door, and on the sloping sides of the opening, small mirrors, arranged (as shown in the drawings) to reflect the light and more fully illuminate the plate, and also give a better appearance to the inside of the door.

My invention will be understood by referring to the drawings, in which Figure 1 is a front view; Fig. 2, a back or inside view, and Fig. 3 an end or sectional view; like letters referring to like parts in each.

A is the bed-frame, to which the plate-frame B is attached by connections *b b*. C are the transparent plates. D, E, F, and G are sections of door. H H are the reflecting and ornamental mirrors. I is a molding holding the mirrors in place, and J is a bell.

I am aware that it is not new to combine a door-plate with a bell or letter-box, as in patents of E. A. Hopkins, dated December 24, 1867, and numbered 72,493; Y. C. Forbes, dated February 20, 1872, and numbered 123,880; and J. J. Rose, dated July 28, 1874, and numnumbered 153,615, and I make no claim thereto.

I am also aware that it is not new to use reflectors in combination with door-plates, as in patent of Grout & Ray, dated March 20, 1844, and numbered 3,496, and I make no claim thereto.

I am not aware that in any previous invention the hinged name-plate frame B was so constructed and arranged that the transparent name-plate could be removed or changed by simply sliding it out through a slot in the frame made for that purpose, and when the name-plate was removed a second plate of glass remained to permanently close the opening; nor am I aware that mirrors were before attached in the manner and for the purpose before shown; therefore,

I claim as my invention—

The combination of the hinged name-plate frame B and the two glass plates with the fixed frame A and the mirrors H H, all arranged in the manner and for the purpose specified.

BENJM. D. STEVENS.

Witnesses:
CHAS. D. MOORE,
S. A. FISHER.